United States Patent [19]
Chang et al.

[11] Patent Number: 5,295,247
[45] Date of Patent: Mar. 15, 1994

[54] LOCAL IDE (INTEGRATED DRIVE ELECTRONICS) BUS ARCHITECTURE

[75] Inventors: Wen L. Chang, Fremont; Justin S. Wang, Saratoga; Dean Chang, Los Altos Hills, all of Calif.

[73] Assignee: Micronics Computers, Inc., Fremont, Calif.

[21] Appl. No.: 870,623

[22] Filed: Apr. 17, 1992

[51] Int. Cl.$^5$ .............................................. G06F 13/00
[52] U.S. Cl. ..................................... 395/325; 395/550
[58] Field of Search ............... 395/325, 750, 800, 400, 395/425, 550

[56] References Cited

U.S. PATENT DOCUMENTS

| | | | |
|---|---|---|---|
| 5,034,917 | 7/1991 | Bland et al. | 395/325 |
| 5,091,850 | 2/1992 | Culley | 395/400 |
| 5,109,517 | 4/1992 | Houda et al. | 395/800 |
| 5,125,080 | 6/1992 | Pleva et al. | 395/325 |
| 5,157,774 | 10/1992 | Culley | 395/425 |
| 5,179,667 | 1/1993 | Iyer | 395/275 |
| 5,179,713 | 1/1993 | Catlin et al. | 395/800 |

*Primary Examiner*—Allen R. MacDonald
*Assistant Examiner*—Ayaz R. Sheikh
*Attorney, Agent, or Firm*—Heller, Ehrman, White & McAuliffe

[57] ABSTRACT

A local bus IDE (Integrated Drive Electronics) interface bus architecture provides a direct connection to enable a fast interface between CPU and IDE drives. Also, a programmable command pulse width and I/O cycle recovery time is implemented at the IDE port to provide a finely tuned tuned access cycle time for different drives and provide optimum performance. Also, there is the capability of implementing existing hard disk interfaces with future drives.

4 Claims, 7 Drawing Sheets

LOCAL IDE (INTEGRATED DRIVE ELECTRONICS) BUS ARCHITECTURE

BACKGROUND OF THE INVENTION

The present invention relates to a local IDE (Integrated Drive Electronics) bus architecture for use in computer technology.

Computer technology has made dramatic progress in recent years. Presently available microprocessors can run ten times faster than five years ago. However, the bus architecture of the current PC has not been changed significantly since IBM introduced the PC AT in the 1980s.

For example, consider the very popular ISA (Industry Standard Architecture) bus whose bandwidth is about 8 MBYTE/s for memory access and 5.3 MBYTE/s for I/O (Input/Output) access. Compare the ISA bus to a 33 MHz 80386DX microprocessor whose bus bandwidth is 132 MBYTE/s. The ISA speed calculation is based on a 8 Mhz bus clock, 2 clocks/memory cycle, 3 clocks/I/O cycle and 16 bits data width. With existing system architectures, the performance of peripheral devices like an IDE (Integrated Drive Electronics) drive would eventually be limited by the ISA bandwidth and the overhead of transferring a host cycle to the ISA.

SUMMARY OF THE INVENTION

It is an object of the present invention to provide an improved local IDE (Integrated Drive Electronics) bus architecture.

In one preferred embodiment, the present invention provides a direct path from an IDE drive to a CPU local bus, which avoids ISA limitations and achieves a more balanced system. This approach is especially significant when a high performance IDE drive is installed in the system.

Other objects, features and advantages of the present invention will become apparent from the following detailed description when taken in conjunction with the accompanying drawings.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
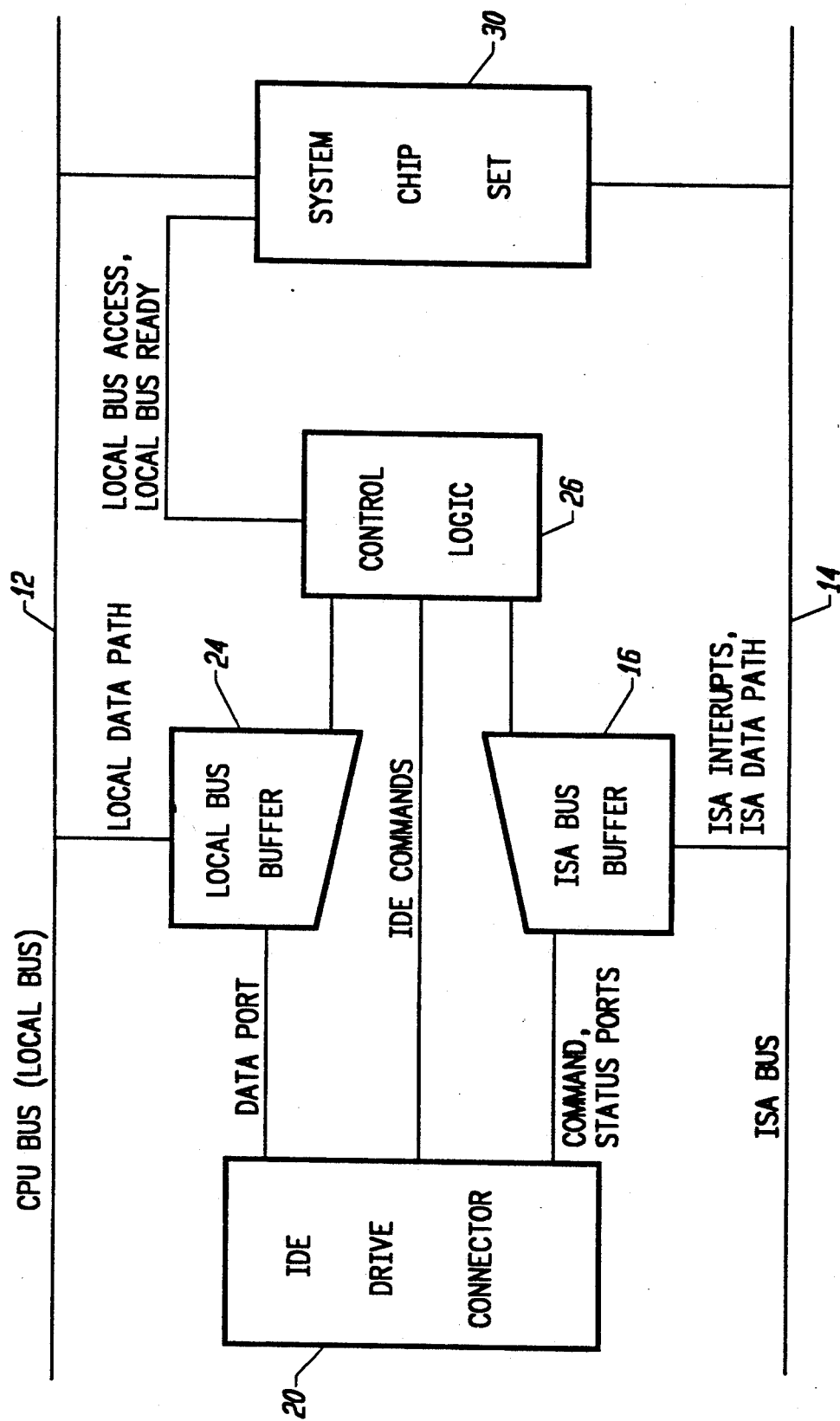
FIG. 1 depicts a block diagram of a local IDE bus architecture according to the present invention.

Referring now to FIG. 1, the local IDE block diagram depicts a CPU bus (local bus) 12 connected to a system chip set 30 and a local bus buffer 24 (the local data path). Control logic 26 provides local bus access and local bus ready signals to system chip set 30.

IDE drive connector 20 provides a data port for local bus buffer 24. IDE commands are provided to IDE drive connector 20 by control logic 26. ISA bus 14 interfaces with ISA bus buffer 16 for ISA interrupts and ISA data path signals. The ISA buffer 16 interfaces to IDE drive connector 20 command and status ports.

Figure 2:
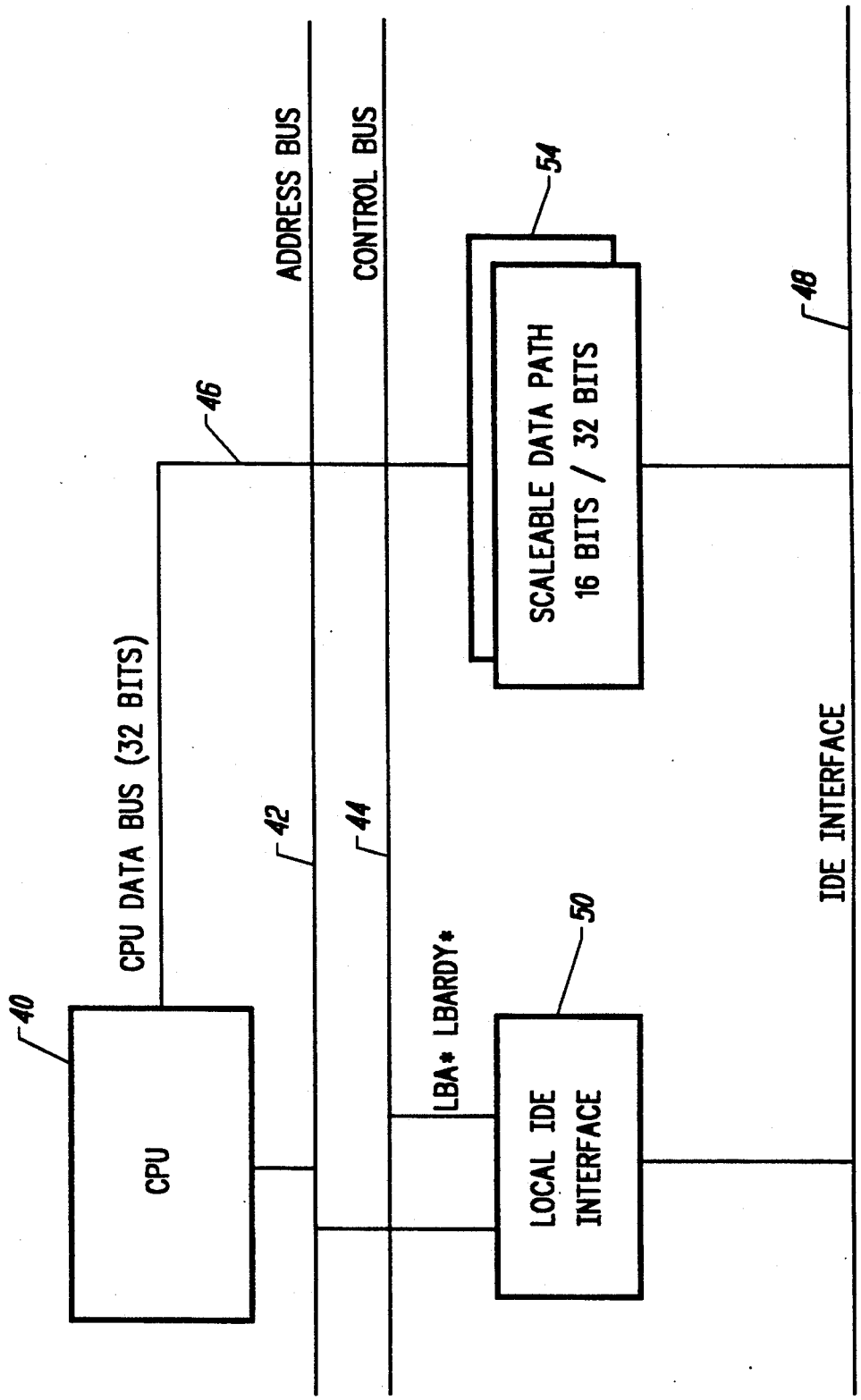
FIG. 2 depicts a block diagram of a local IDE configuration.

FIG. 2 depicts a local IDE configuration with a local IDE interface. In FIG. 2, the direct data path between the IDE and the CPU can be 16 bits or 32 bits (without cycle translation). The local IDE configuration of FIG. 2 includes a scalable data path 54 for the 16 bit/32 bit configuration.

Figure 3:
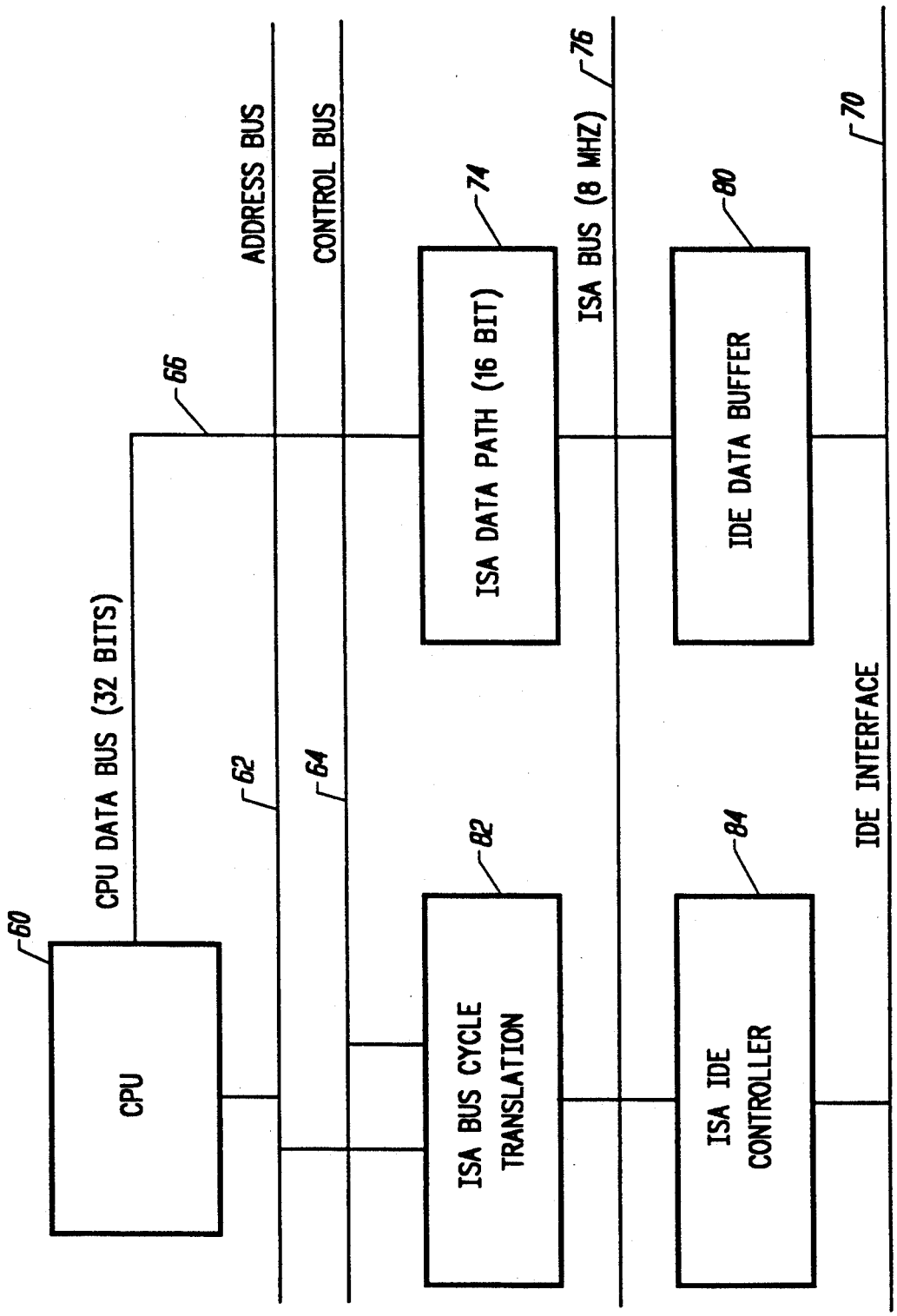
FIG. 3 depicts an ISA IDE configuration.

FIG. 3 depicts an ISA IDE configuration, with an ISA IDE interface. In FIG. 3, the data path is fixed at 16 bits. Also, the ISA bus cycle translation introduces overhead.

The FIG. 3 configuration includes ISA bus cycle translation 82 and ISA IDE controller 84 connected to the IDE interface 70. The configuration of FIG. 3 further includes an ISA data path 74 (16 bit) and an IDE data buffer 80.

In FIG. 2, a local IDE configuration includes an address bus 42 and control bus 44. CPU 40 interfaces via CPU data bus 46 (32 bits) to Scalable Data Path 54 which can scale between 16 and 32 bits to IDE interface 48, as described above.

CPU 40 interfaces to Local IDE Interface 50 through Address Bus 42. Control Bus 44 also interfaces to Local IDE Interface 50.

Referring now to FIG. 3, CPU 60 interfaces via CPU data bus (32 bits) 66 to ISA data path (16 bit) 74. Data path 74 interfaces to IDE Data Buffer 80, which in turn interfaces to IDE interface 70.

In FIG. 3, Address Bus 62 interfaces to CPU 60 as well as ISA Bus Cycle Translation 82. Control bus 64 interfaces to ISA bus cycle translation 82 as well. ISA Bus Cycle Translation 82 interfaces to ISA bus 76 and to ISA IDE Controller 84 to IDE interface 70. ISA bus interfaces between ISA data path 74 and IDE data buffer 80.

As described above, with ISA IDE interface the data path is fixed at 16 bits. Also, the ISA bus cycle translation introduces overhead, as previously described.

A regular IDE drive has 3 different kinds of I/O ports: 01F0h (data port, 16 bits), 01F1h-01F7h (command and status port, 8 bit access only) and 03F6h-03F7h (reset drive and alternate status, 8 bit access only). Normally, all these ports are attached to an ISA bus and accessed through ISA's IORC*/IOWC* command.

There is another set of (alternate) IDE ports (0170h-017Fh, 0376h-0377h). The port mapping is one to one (i.e., 170 replace 1F0, 171 replace 171 ... etc.). The preferred embodiment covers these alternate set of ports as well.

The data port (01F0h) is moved to the CPU local bus 12 of FIG. 1. Also, when the CPU accesses this port, the command pulse width and I/O cycle recovery time are multiples of the CPU clock (and not the fixed multiples of the 8 MHz clock as in the ISA case). The command pulse width and I/O cycle recovery time can be separately programmable in the present invention. Hence, the system integrator has the flexibility to change those values to match the specific IDE drive installed in the system and get optimum performance.

For example, if a drive accepts a 60 ns command pulse and 120 ns back to back I/O cycle, the command pulse is set to 2 CPU clocks and I/O recovery to 4 CPU clocks (assume a 33 MHz system, and one CPU clock period = 30 ns). Compare this to an ISA bus environment where the I/O command length is at least 250 ns (2 bus clocks, bus clock frequency = 8 MHz), and each I/O cycle takes 375 ns to 500 ns. The local cycle is 3 times faster. The remaining ports (01F1h–01F7h, 03F6–03F7h) still stay on the ISA bus since they are not being accessed very often.

Local IDE advantage

In order to characterize the advantage of moving IDE to the local bus, the hard disk access process needs to be understood. For example, to read one sector (512 Bytes) into the system, the CPU issues about 10 I/O cycles to command port 01F0h–01F7h, checks for status and waits for the interrupt. When it is interrupted (that means data is available from the disk), CPU will read data port (01F0h) 256 times to fetch in 512 bytes (one DOS sector) of data.

| If: | R = total time to read |
| --- | --- |
| | C = time to issue command |
| | I = time to wait for interrupt, which also means how fast hard disk can get data ready |
| | D = time for a single data port read |
| Then: | R = C + I + 256 * D |

By implementing the data port on the local bus, D is reduced to 50% or even 200% shorter than the standard ISA cycle. C is fixed since those ports remain on the slower ISA bus, and usually much smaller than I. Hence, the overall percentage of performance improvement depends on: (256 * D) /I.

For currently commercially available high performance IDE drives, the duration of I is short. This is particularly true when the drive has a disk cache embedded. In a cache hit situation (where the data is already in the cache), the hard drive could respond to a request almost immediately and I becomes small. Another issue is that some of such drives already have the capability to transfer multiple sectors at one time. This means that instead of "256 * D" above, (= 1 DOS sector), there could be "512 * D" or "s * 256 * D" in above equation (s = the number of sectors transferred) and the local bus advantage becomes even greater. One preferred embodiment was implemented on a Western Digital WDAP4200 or on a Seagate ST1480A. The results showed a 30%–60% performance improvement in benchmarks like Coretest and Power Meter. Also, the load time measured for Microsoft Windows is two times faster using such drives. Both of these drives have an embedded disk cache and a peak data transfer rate higher than the ISA bandwidth.

Figure 4:
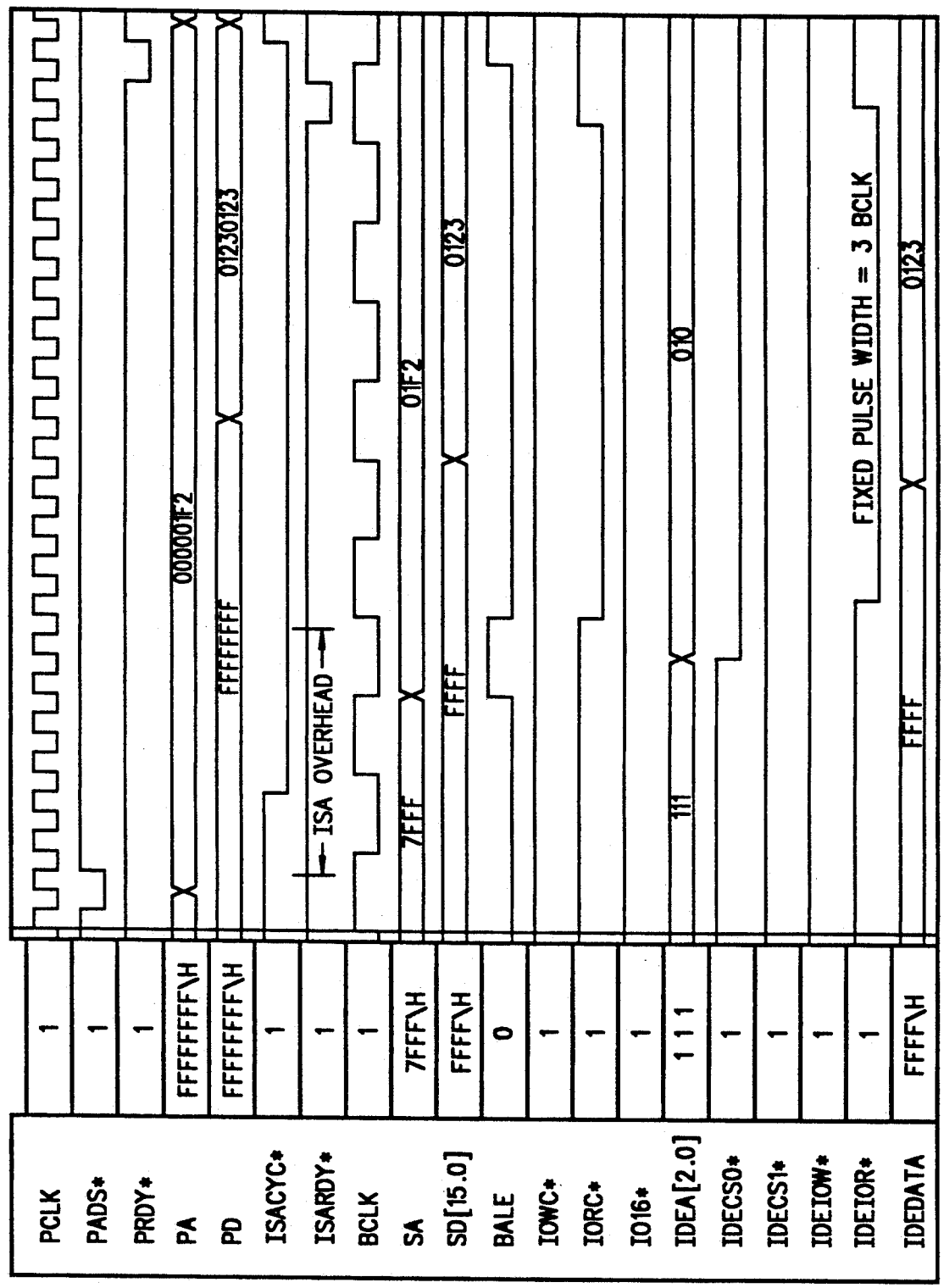
FIGS. 4-6 depict timing diagrams that show the standard ISA configuration where the command cycle is fixed.
Figure 5:
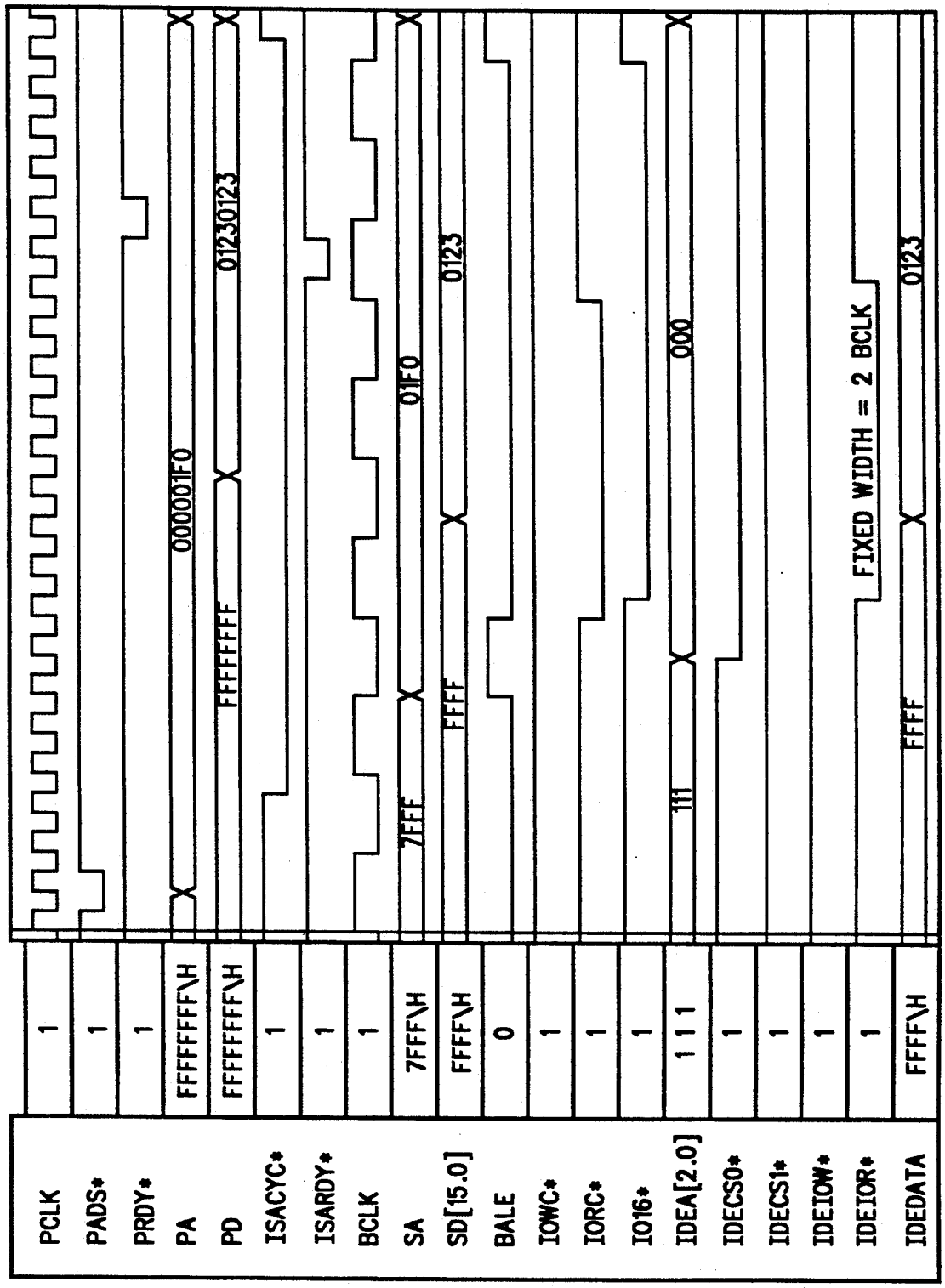
Figure 6:
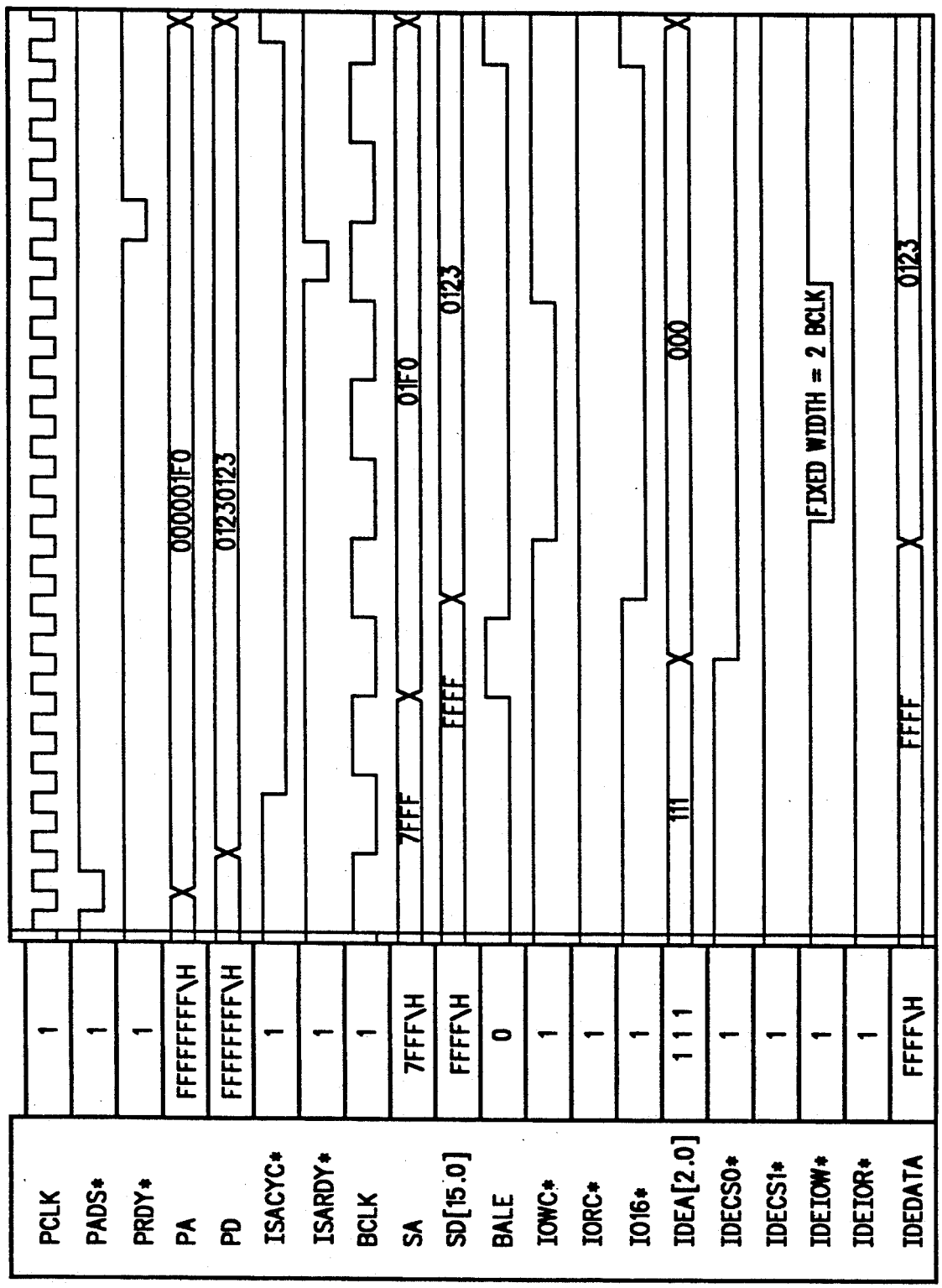

FIGS. 4, 5 and 6 depict three timing wave forms for a standard ISA configuration wherein the command cycle is fixed. Note in FIG. 4 the ISA overhead (which equals 1½ BCLKs). BCLK is the 8 MHz clock on ISA bus. The timing wave form of FIG. 4 is ISA IDE low (8 bit) and shows that the active low IDEIOR signal has a fixed pulse width of 3BCLK.

FIG. 5 depicts an ISA 16 bit access (read). Note in FIG. 5 that the fixed pulse width of the active low IDEIOR signal is equal to 2BCLK.

FIG. 6 depicts an ISA 16 bit IDE access (write). Note in FIG. 6 the fixed pulse width of the active low IDEIOW signal is equal to 2BCLK.

Figure 7:
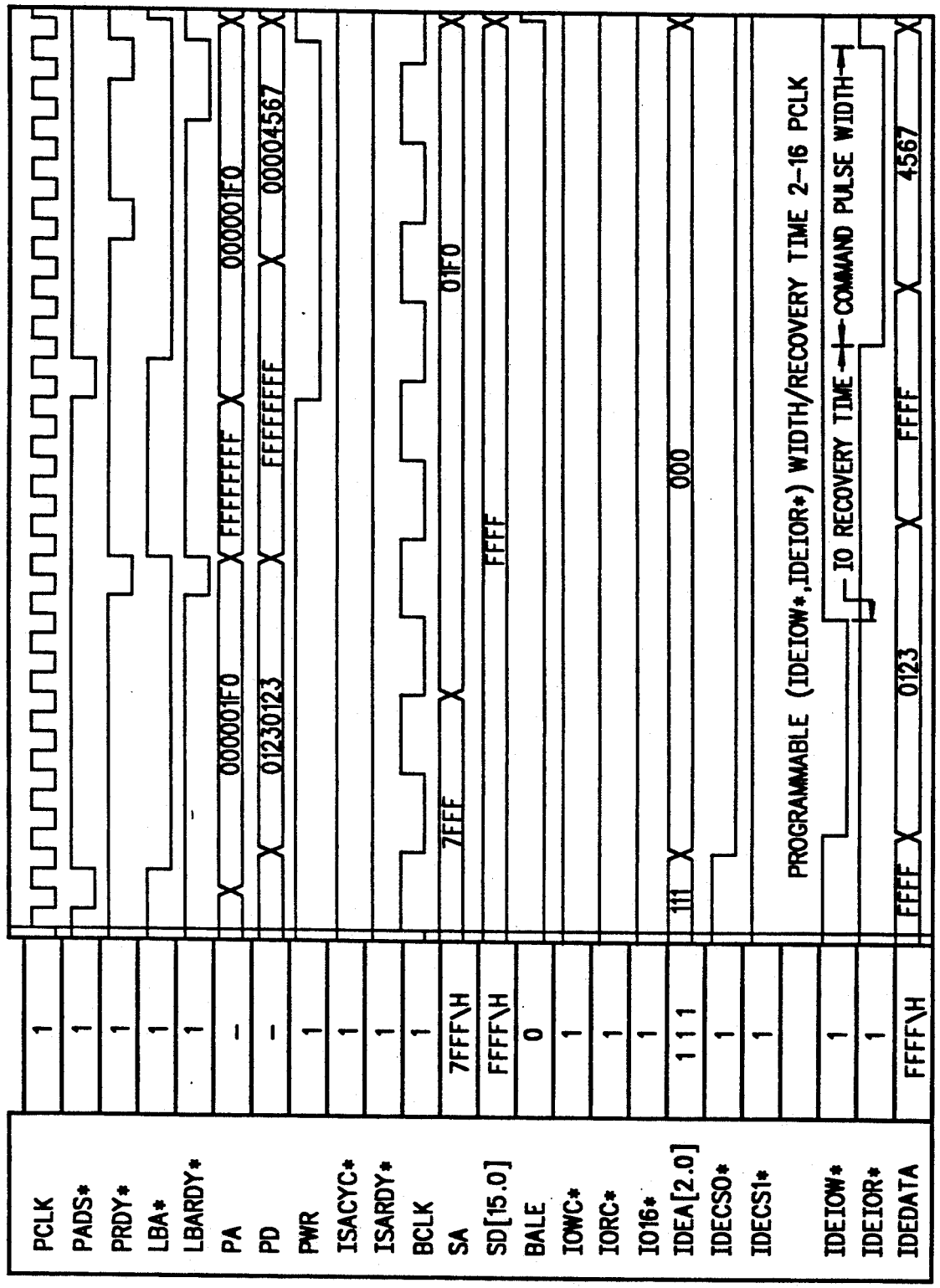
FIG. 7 depicts a timing wave form for local IDE implementation according to the present invention.

FIG. 7 depicts a timing diagram for an local IDE access according to the present invention. Note in FIG. 7 that the command pulse width and the I/O recovery time are programmable. In FIG. 7, note the depiction of the I/O recovery time and command pulse width.

The present invention provides separation of data ports and status/command ports, thus providing a fast interface between the CPU and IDE drives. This eliminates a bottleneck in today's high-performance system.

Also, with programmable command pulse width and I/O cycle recovery time implemented at IDE port, the present invention can provide a finely tuned access cycle time for different drives and achieve optimum system performances.

Finally, at a CPU local bus level, the present invention provides the capability to implement a 32-bit hard disk interface for future 32- bits drives. The overhead is minimum, and the cost is much less than ISA solutions.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A local bus integrated drive electronics (IDE) architecture comprising:
    an IDE interface, said IDE interface including a data port with an address for transferring data, a first command port with addresses for transferring a first set of commands, and a second command port for receiving a second set of commands;
    a hard disk drive coupled to said IDE interface;
    control means coupled to said second command port;
    a CPU coupled to a local bus, said local bus for transmitting data and commands operating at a first clock rate;
    an industry standard architecture (ISA) bus for transmitting data and commands operating at a second clock rate;
    means for interfacing said ISA bus to said local bus of said CPU;
    means for coupling said data port of said IDE interface to said local bus of said CPU;
    means for coupling said first command port of said IDE interface to said ISA bus;
    means for transferring said data and said second set of commands between said hard disk drive and said CPU in proportion to said first clock rate; and means for transferring said first set of commands between said CPU and said hard disk drive in proportion to said second clock rate.

2. The architecture as in claim 1 wherein said second command port of said IDE interface has a software programmable command pulse width.

3. The architecture as in claim 1 including a software programmable I/O cycle recovery time to satisfy the I/O cycle recovery time requirements of various models of said hard disk drive.

4. The architecture as in claim 1 wherein said first clock rate is greater than said second clock rate.

* * * * *